United States Patent
Rutigliano (10) Patent No.: US 12,434,504 B2
(45) Date of Patent: Oct. 7, 2025

(54) MARKING SYSTEMS AND METHODS FOR FIBER-BASED PRODUCTS

(71) Applicant: Footprint International LLC, Gilbert, AZ (US)

(72) Inventor: Michael Rutigliano, Chandler, AZ (US)

(73) Assignee: FOOTPRINT INTERNATIONAL, LLC, Gilbert, AZ (US)

( * ) Notice: Subject to any disclaimer, the term of this patent is extended or adjusted under 35 U.S.C. 154(b) by 0 days.

(21) Appl. No.: 17/975,315

(22) Filed: Oct. 27, 2022

(65) Prior Publication Data

US 2023/0131528 A1 Apr. 27, 2023

Related U.S. Application Data

(60) Provisional application No. 63/272,639, filed on Oct. 27, 2021.

(51) Int. Cl.
*B44B 5/02* (2006.01)
*B44B 5/00* (2006.01)
(Continued)

(52) U.S. Cl.
CPC ............ *B44B 5/028* (2013.01); *B44B 5/0009* (2013.01); *B44B 5/0052* (2013.01);
(Continued)

(58) Field of Classification Search
CPC ... B44B 5/0009; B44B 5/0052; B44B 5/0076; B44B 5/028; B44B 7/00; B44C 1/24
See application file for complete search history.

(56) References Cited

U.S. PATENT DOCUMENTS 2,249,627 A * 7/1941 Drucker .................. B44B 5/028
101/110
4,007,767 A * 2/1977 Colledge ................... B44B 7/00
144/380

(Continued)

FOREIGN PATENT DOCUMENTS

DE 3713108 A1 * 12/1987 ............... B44C 1/02

OTHER PUBLICATIONS

Belgacem, et al., "Lignocellulosic Fibers and Wood Handbook: Renewable Materials for Today's Environment," Scrivener Publishing, LLC, 2016; (https://books.google.com/books?id=jTL8CwAAQBAJ &printsec-frontcover#v=onepage&q&f=false).

(Continued)

*Primary Examiner* — Jill E Culler
(74) *Attorney, Agent, or Firm* — Quarles & Brady LLP (57) ABSTRACT

A method of marking a fiber-based product includes providing a heat stamp apparatus including a heating element thermally coupled to a stamping block and a temperature sensor thermally coupled to the stamping block. The system further includes a platen bearing an embossed pattern. Marking is accomplished by heating the stamping element to a predetermined temperature via the heating element and information acquired from the temperature sensor, then bringing the embossed pattern in relation to the surface of the fiber-based product (e.g., via direct contact and compression or simply very close to the surface) to form at least one of a corresponding three-dimensional contour and charred surface region.

5 Claims, 4 Drawing Sheets

Heat Stamp (51) Int. Cl.
  *B44C 1/24* (2006.01)
  *B44B 7/00* (2006.01)
  *B44C 1/02* (2006.01)

(52) U.S. Cl.
  CPC .............. *B44B 5/0076* (2013.01); *B44C 1/24* (2013.01); *B44B 7/00* (2013.01); *B44C 1/02* (2013.01)

(56) References Cited

U.S. PATENT DOCUMENTS 5,069,122 A * 12/1991 Kaufmann ................ B44B 7/00
  101/31
5,169,497 A    12/1992 Sarkar et al.
7,913,619 B2 *  3/2011 Hogl ..................... B44B 5/0009
  101/31

OTHER PUBLICATIONS

Ohlsson, et al., "Efficient Use of Flourescent Whitening Agents and Shading Colorants in the Production of White Paper and Board." African Pulp and Paper Week; Oct. 8, 2002; (tappsa.co.za/archive/APPW2002/Title/Efficient_use_of_fluorescent_w/efficient_use_of_fluorescent_w.html).

Kennedy, et al., Cellulosic Pulps, Fibres and Materials: Cellucon '98 Proceedings, Woodhead Publishing Ltd, 2000 (books.google.com/books?id=xO2iAgAAQBAJ&printsec=frontcover#v=onepage&q&f=false).

FOBChem, Alkyl Ketene Dimer (AKD Wax); screenshot, no date (fobchem.com/html_products/Alkyl-Ketene-Dimer%EF%BC%88AKD-WAX%EF%BC%89.html#.V0zozvkrKUk).

Yanzhou Tiancheng Chemical Co., Ltd., Screenshot, no date (yztianchengchem.com/en/index.php?m=content&c=index&a=show&catid=38&id=124&gclid=CPbn65aUg80CFRCOaQod0JUGRg) Screenshot, no date.

* cited by examiner

FIG. 1
Heat Stamp

MARKING SYSTEMS AND METHODS FOR FIBER-BASED PRODUCTS

CROSS-REFERENCE TO RELATED APPLICATIONS

This application claims the benefit of U.S. Provisional Patent App. No. 63/272,639, filed Oct. 27, 2021, the entire contents of which are hereby incorporated by reference.

TECHNICAL FIELD

The present invention relates, generally, to the manufacture of fiber-based products and, more particularly, to marking such products in the interest of product serialization, traceability, and branding.

BACKGROUND

With respect to many products—particularly food products—lot and/or unit traceability is a desirable and often required feature. This traceability may be accomplished at customer facilities during product fulfillment and final packaging, or it can occur in the manufacturing flow of the food container itself. Lot traceability can extend to individual unit serialization in which individual units have a unique serial number. These features aide in product recalls and can also provide product key information, such as brands, date codes of manufacturing, product SKUs, and the like. This information can also be used in connection with process control, quality assurance, and reliability testing.

While product marking is advantageous, it is difficult to implement with pulp-based products. By way of brief background, molded paper pulp (molded fiber) has been used since the 1930s to make containers, trays and other packages, but experienced a decline in the 1970s after the introduction of plastic foam packaging. Paper pulp can be produced from old newsprint, corrugated boxes and other plant fibers. Today, molded pulp packaging is widely used for electronics, household goods, automotive parts and medical products, and as an edge/corner protector or pallet tray for shipping electronic and other fragile components. Molds are shaped as a mirror image of the finished package, with a screen is attached to its surface. A vacuum is drawn across the screen to build up fiber particles into the shape of the finished product.

The two most common types of molded pulp are classified as Type 1 and Type 2. Type 1 molded pulp manufacturing, also known as "dry" manufacturing, uses a fiber slurry made from ground newsprint, kraft paper or other fibers dissolved in water. A mold mounted on a platen is dipped or submerged in the slurry and a vacuum is applied to the generally convex backside. The vacuum pulls the slurry onto the mold to form the shape of the package. While still under the vacuum, the mold is removed from the slurry tank, allowing the water to drain from the pulp. Air is then blown through the tool to eject the molded fiber piece. The part is typically deposited on a conveyor within a drying oven.

Type 2 molded pulp manufacturing, also known as "wet" manufacturing, is typically used for packaging electronic equipment, cellular phones and household items with containers having particular wall dimensions. Type 2 molded pulp uses the same material and follows the same basic process as Type 1 manufacturing up the point where the vacuum pulls the slurry onto the mold. After this step, a transfer mold mates with the fiber package, moves the formed "wet part" to a hot press, and compresses and dries the fiber material to increase density and provide a smooth external surface finish.

Fiber-based packaging products are biodegradable, compostable and, unlike plastics, do not migrate into the ocean. However, as noted above, methods for marking the relatively course, processed fiber surface of these fiber-based products are not well developed in the prior art.

Systems and methods are thus needed which overcome the limitations of the prior art. Various features and characteristics will also become apparent from the subsequent detailed description and the appended claims, taken in conjunction with the accompanying drawings and this background section.

BRIEF SUMMARY

Various embodiments of the present invention relate to systems and methods for marking fiber-based (e.g., pulp) products for the purposes of product serialization, traceability, and branding. The marking preferably involves ablating the pulp surface to form a three-dimensional contour in the base material, thereby changing the optical properties of the surface (e.g., via laser marking, hot stamping). Various methods for high-speed branding (e.g., rotation of a set of radially oriented hot stamp blocks) are also described.

The marking itself might include product logos as well as markings that can be read via machine vision, such as QR codes, binary codes, 2DID marks, bar codes, human readable OCR, and any combination thereof. These markings can be applied by laser marking, pad printing with ink, hot stamps, or in-mold dials.

It should be noted that the various inventions described herein, while illustrated in the context of conventional slurry-based vacuum form processes, are not so limited. Those skilled in the art will appreciate that the inventions described herein may contemplate any fiber-based manufacturing modality, including dry or fluff processes which may or may not involve vacuum forming, including 3D printing techniques.

Various other embodiments, aspects, and features are described in greater detail below.

BRIEF DESCRIPTION OF THE DRAWING FIGURES

Exemplary embodiments will hereinafter be described in conjunction with the appended drawing figures, wherein like numerals denote like elements, and.

DETAILED DESCRIPTION OF PREFERRED EXEMPLARY EMBODIMENTS

The following detailed description of the invention is merely exemplary in nature and is not intended to limit the invention or the application and uses of the invention. Furthermore, there is no intention to be bound by any theory presented in the preceding background or the following detailed description.

As mentioned briefly above, the present invention relates to systems and methods for marking fiber-based products for the purposes of product serialization, traceability, and branding. In accordance with various embodiment, this marking is accomplished by ablating the pulp surface to form a three-dimensional contour in the base material, thereby changing the optical properties of the surface.

The marking itself may characterized by three properties: (1) its content (i.e., what information is conveyed, such as lot number, date, etc.), its form (i.e., QR code, bar code, 2DID mark, or the like), and its application method (e.g., laser marking, pad printing with ink, heat stamps, or in-mold dials).

EXAMPLE 1

Heat-Stamp Marking/Branding

While the present invention may be employed to achieve the marking of a wide range of content, forms, and application methods, a particular hot-stamp technique will now be described in detail.

Figure 1:
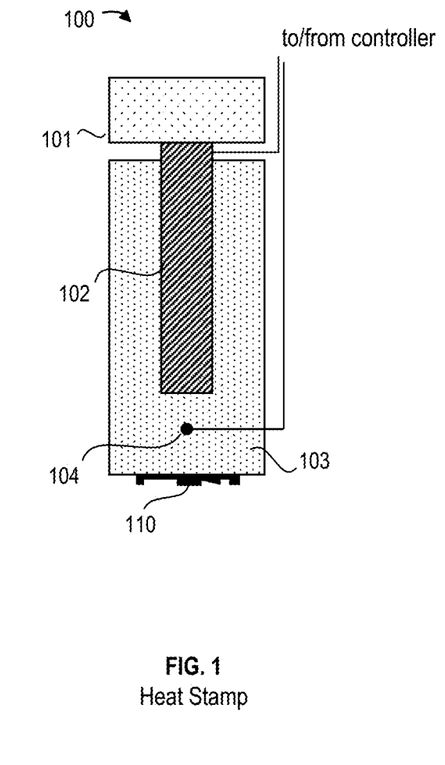
FIG. 1 is a schematic diagram of a heat stamp apparatus in accordance with an example embodiment.

Referring first to FIG. 1, an example heat stamp apparatus 100 generally includes a heating element (e.g., a cartridge heater or blanket heater) 102 encased within a metal stamping block 103. Heating element 102 is coupled to an insulator block 101 at one end, as shown, and is connected to an appropriate power source/controller (not illustrated) configured to control power applied to the heating element, which may be open loop or closed loop, as is known in the art. That is, a desired temperature of set-point may be specified based on the nature of the material, etc., and the controller then provides power to heating element 102 to achieve that set-point. Also thermally coupled to stamping block 103 is a temperature sensor (e.g., thermocouple) 104, which is also communicatively coupled to the controller to thereby allow for closed-loop control and stabilization of the temperature of stamping block 103, as previously described.

On the bottom surface of stamping block 103 is provided a platen 110 bearing an embossed pattern (e.g., negative or positive embossing) that will ultimately be stamped into the pulp-based product. Platen 110 is thermally coupled to stamping block 103, and is preferably removably attached thereto. As described above, the embossed pattern on platen 110 may take a variety of forms and include any desired content (e.g., brand graphic, bar code, or the like). During operation, heating element 102 is first brought to the desired temperature (e.g., 425-475° F., preferably about 450° F.) via the controller, using information from temperature sensor 104. This will typically be time, temperature, and pressure dependent, however, and may be selected based on a variety of factors.

Embossing may be subtle, and not be readily apparent, since the result could be very light in depth (e.g., less than 1.0 micron). In other embodiments, the pattern is between 1.0 micron and 2.0 mm. The embossing head, if appropriately controlled, may not need direct contact. If controlled in the z-direction at the micron level accuracy, there may be a small air gap while still providing a suitable mark (e.g., discoloration or charring of the pulp surface). In the event that contact is desired, platen 110 is brought into contact with the product surface, and a sufficient pressure is applied (and/or the embossed pattern is pressed into the surface by a suitable displacement) such that a three-dimensional contour is formed in the product. In some cases, both the charring and embossing depth are used to produce the finished visual appearance of the mark. As will be appreciated, the level of charring may be selected based on the temperature of the embossing head, the pressure applied to the product, and the time in which the two are in contact.

Figure 2:
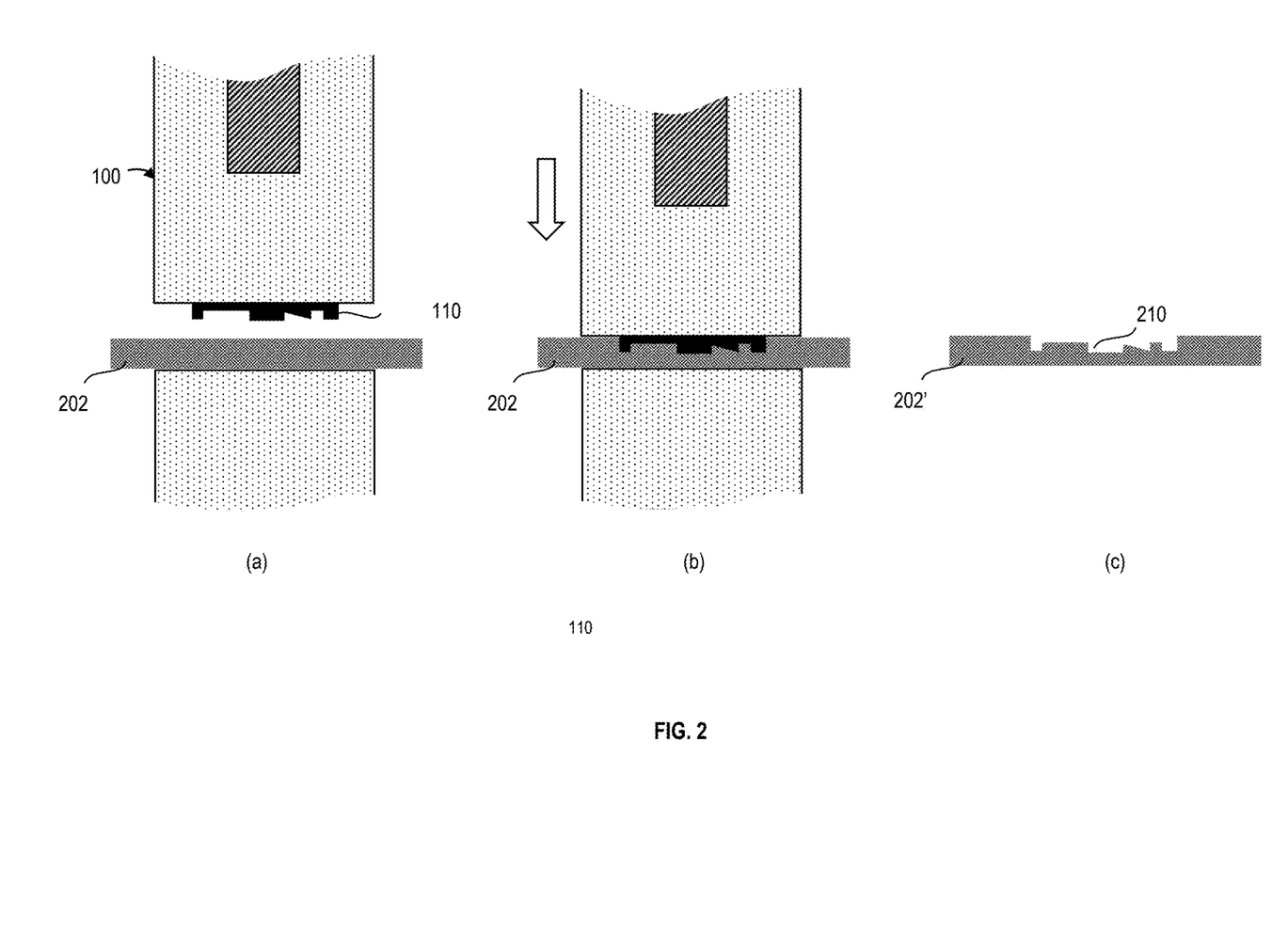
FIG. 2 illustrates a heat-stamping/branding process in accordance with one embodiment.

This is illustrated in FIG. 2, which shows, conceptually, a heat-stamping/branding process in accordance with one embodiment. That is, in FIG. 2(a), the platen/embossed form 110 is shown above the surface of the product to be stamped (202), which lies on a base block. In FIG. 2(b), the platen is shown moving downward onto and into the surface of the product 202, after which, as illustrated in FIG. 2(c), the three-dimensional contour 210 can be observed within the modified product 202.

Figure 3:
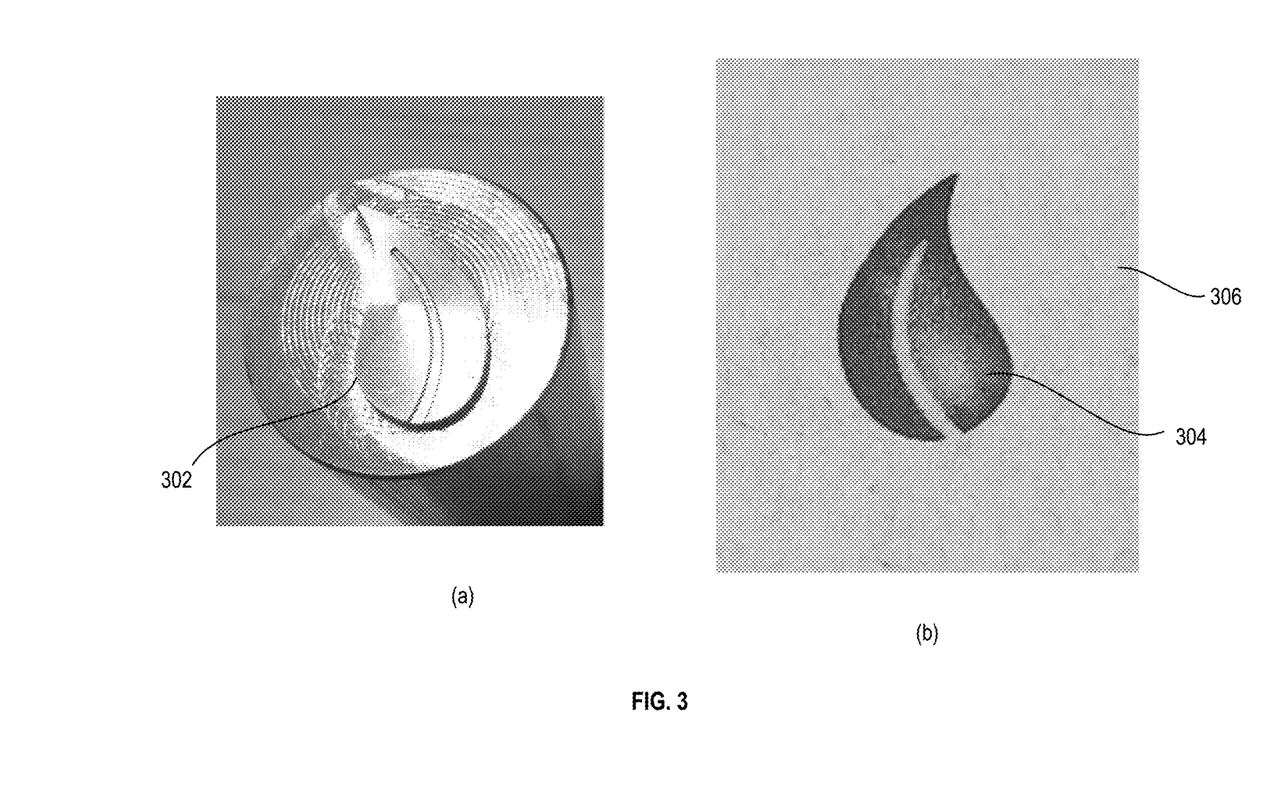
FIG. 3 illustrates an example embossed platen design and associated stamped/branded mark.

FIG. 3 illustrates just one example embossed platen design and associated stamped/branded mark. More particularly, FIG. 3(a) illustrates the bottom embossed pattern (and platen) 302 of a stamping block bearing a leaf-pattern (in positive relief). FIG. 3(b) shows the corresponding mark 304 within the pulp-based product 306. As illustrated, mark 304 is darkened due to the applied heat, and its edges are contoured to match the shape of platen pattern 302.

Figure 4:
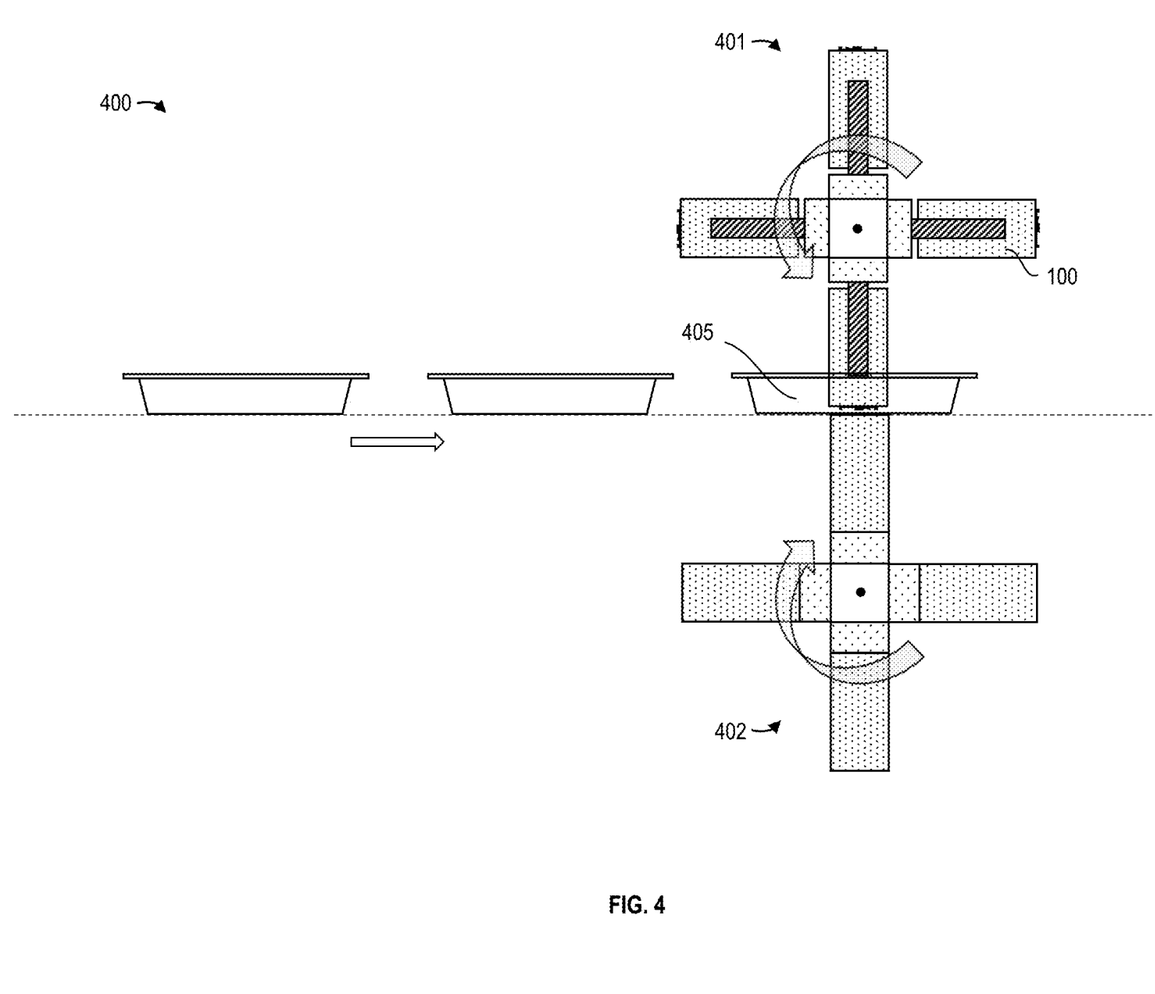
FIG. 4 illustrates a high-speed heat stamp assembly in accordance with one embodiment.

While the heat-block system illustrated above may be implemented in a variety of ways, in a preferred embodiment the system is deployed in an automated fashion to increase throughput speed. FIG. 4, for example, illustrates a high-speed heat stamp assembly 400 in accordance with one embodiment.

As shown, a series of products 405 (in this example, shallow bowls) progress from left to right along a conveyer belt. At the same time, a heat stamp assembly 401 and corresponding base block assembly 402 rotate (counter-clockwise and clockwise, respectively) and are positioned such that, when they are aligned (as in the figure) a resultant compressive force is applied to the surface of the plate, thereby applying the desired mark, as described above.

While FIG. 4 illustrates a set of four radially oriented stamping blocks are illustrated, the invention is not so limited, and may comprehend any number of such stamping blocks (e.g., three or five blocks) and may be configured to apply pressure to product 405 in a variety of ways.

Other marking schemes are also contemplated, including ink, galvo-steered $CO_2$ laser marking, silicon gradventure pad marking, ink-jet, and the like. High-flux thermals may be performed by way of aluminum nitride heater elements for ultra-fast response times. Spring loaded pressure heads, or pressure feedback with a load cell, may also be used.

Fiber-Based Containers in General

The marking systems and methods described above may be used in the context of products manufactured using a fiber base mixture of pulp and water, with added chemical components to impart desired performance characteristics tuned to each particular product application. The section that follows summarizes such applications to the extent it is helpful in understanding the context of the present invention.

In general, the base fiber may include any one or combination of at least the following materials: softwood (SW), bagasse, bamboo, old corrugated containers (OCC), and newsprint (NP). Alternatively, the base fiber may be selected in accordance with the following resources, the entire contents of which are hereby incorporated by this reference: "Lignocellulosic Fibers and Wood Handbook: Renewable Materials for Today's Environment," edited by Mohamed Naceur Belgacem and Antonio Pizzi (Copyright 2016 by Scrivener Publishing, LLC) and available at https: books.google.com/ books?id=jTL8CwAAQBAJ&printsec=frontcover#v= onepage&q&f=false; "Efficient Use of Flourescent Whitening Agents and Shading Colorants in the Production of White Paper and Board" by Liisa Ohlsson and Robert Federe, Published Oct. 8, 2002 in the African Pulp and Paper Week and available at tappsa.co.za/archive/APPW2002/Title/Efficient_use_of_fluorscent_w/efficient_use_of_floursecent_w.html; Cellulosic Pulps, Fibres and Materials: Cellucon '98 Proceedings, edited by J F Kennedy, G O Phillips, P A Williams, copyright 200 by Woodhead Publishing Ltd. and available at books.google.com/books?id=XO2iAgAAQBAJ&printsec=frontcover#v=onepage&q&f=false; and U.S. Pat. No. 5,169,497 A entitled "Application of Enzymes and Flocculants for Enhancing the Freeness of Paper Making Pulp" issued Dec. 8, 1992.

For vacuum molded produce containers manufactured using either a wet or dry press, a fiber base of OCC or OCC/DLK and NP may be used, where the OCC/DLK component is between 50%-100%, and preferably about 70% OCC/DLK and 30% NP or VNP, with an added moisture/water repellant in the range of 1%-10% by weight, and preferably about 1.5%-4%, and most preferably about 4%. In a preferred embodiment, the moisture/water barrier may comprise alkyl ketene dimer (AKD) (for example, Hercon 79, Hercon 80) and/or long chain diketenes, available from FOBCHEM at fobchem.com/html_products/Alkyl-Ketene-Dimer%EF%BC%88AKD-WAX%EF%BC%89.html#.V0zozvkrKUk; and Yanzhou Tiancheng Chemical Co., Ltd. at yztianchengchem.com/en/index.php?m=content&c=index&a=show&catid=38&id=124&gclid=CPbn65aUg80CFRCOaQod0JUGRg.

In order to yield specific colors for molded pulp products, cationic dye or fiber reactive dye may be added to the pulp. Fiber reactive dyes, such as Procion MX, bond with the fiber at a molecular level, becoming chemically part of the fabric. Also, adding salt, soda ash and/or increase pulp temperature will help the absorbed dye to be furtherly locked in the fabric to prevent color bleeding and enhance the color depth.

To enhance structural rigidity, a starch or other strength additive may be added to the slurry, for example, liquid starches available commercially as Topcat® L98 cationic additive (or Hercobond 6950 available from Solenis LLC), Hercobond, and Topcat® L95 cationic additive (available from Penford Products Co. of Cedar Rapids, Iowa). Alternatively, the liquid starch can also be combined with low charge liquid cationic starches such as those available as Penbond® cationic additive and PAF 9137 BR cationic additive (also available from Penford Products Co., Cedar Rapids, Iowa).

For dry press processes, Topcat L95 or Hercobond 6950 may be added as a percent by weight in the range of 0.5%-10%, and preferably about 1%-7%, and particularly for products which need maintain strength in a high moisture environment most preferably about 6.5%; otherwise, most preferably about 1.5-2.0%. For wet press processes, dry strength additives such as Topcat L95 or Hercobond 6950 which are made from modified polyamines that form both hydrogen and ionic bonds with fibers and fines. Dry strength additives help to increase dry strength, as well as drainage and retention, and are also effective in fixing anions, hydrophobes and sizing agents into fiber products. Those additives may be added as a percent by weight in the range of 0.5%-10%, and preferably about 1%-6%, and most preferably about 3.5%. In addition, both wet and dry processes may benefit from the addition of wet strength additives, for example solutions formulated with polyamide-epichlorohydrin (PAE) resin such as Kymene 920A or 1500 or similar component available from Ashland Specialty Chemical Products at ashland.com/products. In a preferred embodiment, Kymene 920A or 1500 may be added in a percent by volume range of 0.5%-10%, and preferably about 1%-4%, and most preferably about 2% or equal amount with dosing of dry strength additives. Kymene 920A or 1500 is of the class of polycationic materials containing an average of two or more amino and/or quaternary ammonium salt groups per molecule. Such amino groups tend to protonate in acidic solutions to produce cationic species. Other examples of polycationic materials include polymers derived from the modification with epichlorohydrin of amino containing polyamides such as those prepared from the condensation adipic acid and dimethylene triamine, available commercially as Hercosett 57 from Hercules and Catalyst 3774 from Ciba-Geigy.

The present inventor has determined that molded fiber containers can be rendered suitable as single use food containers suitable for use in microwave, convection, and conventional ovens by embedding barrier chemistries into the slurry, adding a topical coating to the finished vacuum formed container, or both. In particular, the slurry and/or topical coating chemistry should advantageously accommodate one or more of the following three performance metrics: i) moisture barrier; ii) oil barrier; and iii) water vapor (condensation) barrier to avoid condensate due to placing the hot container on a surface having a lower temperature than the container.

In this context, the extent to which water vapor permeates the container is related to the porosity of the container, which the present invention seeks to reduce. That is, even if the container is effectively impermeable to oil and water, it may nonetheless compromise the user experience if water vapor permeates the container, particularly if the water vapor condenses on a cold surface, leaving behind a moisture ring. The present inventor has further determined that the condensate problem is uniquely pronounced in fiber-based applications because water vapor typically does not permeate a plastic barrier.

Accordingly, for microwavable containers the present invention contemplates a fiber or pulp-based slurry including a water barrier, oil barrier, and water vapor barrier, and an optional retention aid. In an embodiment, a fiber base of softwood (SW)/bagasse at a ratio in the range of about 10%-90%, and preferably about 7:3 may be used. As a moisture barrier, AKD may be used in the range of about 0.5%-10%, and preferably about 1.5%-4%, and most preferably about 3.5%. As an oil barrier, the grease and oil repellent additives are usually water based emulsions of fluorine containing compositions of fluorocarbon resin or other fluorine-containing polymers such as UNIDYNE TG 8111 or UNIDYNE TG-8731 available from Daikin or World of Chemicals at worldofchemicals.com/chemicals/chemical-properties/unidyne-tg-8111.html. The oil barrier component of the slurry (or topical coat) may comprise, as a percentage by weight, in the range of 0.5%-10%, and preferably about 1%-4%, and most preferably about 2.5%. As a retention aid, an organic compound such as Nalco 7527 available from the Nalco Company of Naperville, Ill. May be employed in the range of 0.1%-1% by volume, and preferably about 0.3%. Finally, to strengthen the finished product, a dry strength additive such as an inorganic salt (e.g., Hercobond 6950 available at solenis.com/en/industries/tissue-towel/innovations/hercobond-dry-strength-additives/; see also sfm.state.or.us/CR2K_SubDB/MSDS/HERCOBOND_6950.PDF) may be employed in the range of 0.5%-10% by weight, and preferably about 1.5%-5%, and most preferably about 4%.

As mentioned, vapor barrier performance is directly impacted by porosity of the fiber tray. Reducing the porosity of the fiber tray and, hence, improving vapor barrier performance can be achieved using at least two approaches. One is by improving freeness of the tray material by grinding the fibers. The second way is by topical spray coating using, for example, Daikin 52066, which is a water based long chain Fluorine-containing polymer. Spray coating may be implemented using in the range of about 0.1%-3% by weight, and preferably about 0.2%-1.5%, and most preferably about 1%.

Presently known meat trays, such as those used for the display of poultry, beef, pork, and seafood in grocery stores, are typically made of plastic based materials such as polystyrene and Styrofoam, primarily because of their superior moisture barrier properties. The present inventor has determined that variations of the foregoing chemistries used for microwavable containers may be adapted for use in meat trays, particularly with respect to the moisture barrier (oil and porosity barriers are typically not as important in a meat tray as they are in a microwave container).

Accordingly, for meat containers the present invention contemplates a fiber or pulp-based slurry including a water barrier and an optional oil barrier. In an embodiment, a fiber base of softwood (SW)/bagasse and/or bamboo/bagasse at a ratio in the range of about 10%-90%, and preferably about 7:3 may be used. As a moisture/water barrier, AKD may be used in the range of about 0.5%-10%, and preferably about 1%-4%, and most preferably about 4%. As an oil barrier, a water based emulsion may be employed such as UNIDYNE TG 8111 or UNIDYNE TG-8731. The oil barrier component of the slurry (or topical coat) may comprise, as a percentage by weight, in the range of 0.5%-10%, and preferably about 1%-4%, and most preferably about 1.5%. Finally, to strengthen the finished product, a dry strength additive such as Hercobond 6950 may be employed in the range of 0.5%-10% by weight, and preferably about 1.5%-4%, and most preferably about 4%.

As discussed above in connection with the produce containers, the slurry chemistry and/or spray coating chemistry may be combined with structural features to provide prolonged rigidity over time by preventing moisture/water from penetrating into the tray.

Embodiments of the present disclosure may be described in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, field-programmable gate arrays (FPGAs), Application Specific Integrated Circuits (ASICs), logic elements, look-up tables, or the like, which may carry out a variety of functions under the control of one or more microprocessors or other control devices.

In addition, the various functional modules described herein may be implemented entirely or in part using a machine learning or predictive analytics model. In this regard, the phrase "machine learning" model is used without loss of generality to refer to any result of an analysis that is designed to make some form of prediction, such as predicting the state of a response variable, clustering patients, determining association rules, and performing anomaly detection. Thus, for example, the term "machine learning" refers to models that undergo supervised, unsupervised, semi-supervised, and/or reinforcement learning. Such models may perform classification (e.g., binary or multiclass classification), regression, clustering, dimensionality reduction, and/or such tasks. Examples of such models include, without limitation, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, etc.), linear discriminant analysis models.

In summary, the present subject matter relates to a method of marking a fiber-based product, comprising: providing a heat stamp apparatus including a heating element thermally coupled to a stamping block, a temperature sensor thermally coupled to the stamping block, and a platen bearing an embossed pattern; heating the stamping element to a predetermined temperature via the heating element and information acquired from the temperature sensor; and bringing the embossed pattern in relation to the surface of the fiber-based product to form at least one of a corresponding three-dimensional contour and charred surface region.

In accordance with another embodiment, a system for high-speed marking of a fiber-based product includes a plurality of radially oriented heat stamp assemblies, each including a heating element thermally coupled to a stamping block, a temperature sensor thermally coupled to the stamping block, and a platen bearing an embossed pattern; a controller configured to heat the stamping element to a predetermined temperature via the heating element and information acquired from the temperature sensor; and rotatably bringing the embossed patterns of the heat stamp assemblies into contact with, or close to, a surface of the fiber-based products to form corresponding three-dimensional contours and charred surface regions.

In addition, those skilled in the art will appreciate that embodiments of the present disclosure may be practiced in conjunction with any number of systems, and that the systems described herein are merely exemplary embodiments of the present disclosure. Further, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the terms "module" or "controller" refer to any hardware, software, firmware, electronic control component, processing logic, and/or processor device, individually or in any combination, including without limitation: application specific integrated circuits (ASICs), field-programmable gate-arrays (FPGAs), dedicated neural network devices (e.g., Google Tensor Processing Units), electronic circuits, processors (shared, dedicated, or group) configured to execute one or more software or firmware programs, a combinational logic circuit, and/or other suitable components that provide the described functionality.

While the present invention has been described in the context of the foregoing embodiments, it will be appreciated that the invention is not so limited. As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A system for high-speed marking of a fiber-based product, comprising:
   a plurality of radially oriented heat stamp assemblies, each including a heating element thermally coupled to a stamping block, a temperature sensor thermally coupled to the stamping block, and a platen bearing an embossed pattern;
   a controller configured to heat the stamping element to a predetermined temperature via the heating element and information acquired from the temperature sensor; and
   rotatably bring the embossed patterns of the heat stamp assemblies adjacent to, but not in contact with, the fiber-based product to thereby produce a charred region corresponding to the embossed pattern.

2. The system of claim 1, wherein the embossed pattern is selected from the group consisting of a brand design, a QR code, and a bar code).

3. The system of claim 1, wherein the predetermined temperature is between 425-475 degrees Fahrenheit.

4. The system of claim 1, wherein the fiber-based product is formed via a fiber-based slurry including a moisture barrier, an oil barrier, and a water vapor barrier.

5. The system of claim 1, wherein the fiber-based product further includes a strength additive.

* * * * *